US012654987B2

(12) United States Patent
Cope et al.

(10) Patent No.: US 12,654,987 B2
(45) Date of Patent: Jun. 16, 2026

(54) ELEVATOR SYSTEMS AND ROBOT OPERATIONS ASSOCIATED THEREWITH

(71) Applicant: Otis Elevator Company, Farmington, CT (US)

(72) Inventors: Nick Cope, Brooklyn, NY (US); Michael P. Keenan, Jr., Suffield, CT (US); Arthur Hsu, South Glastonbury, CT (US)

(73) Assignee: OTIS ELEVATOR COMPANY, Farmington, CT (US)

( * ) Notice: Subject to any disclaimer, the term of this patent is extended or adjusted under 35 U.S.C. 154(b) by 1024 days.

(21) Appl. No.: 17/851,356

(22) Filed: Jun. 28, 2022

(65) Prior Publication Data

US 2023/0416048 A1     Dec. 28, 2023

(51) Int. Cl.
*B66B 5/00* (2006.01)
*B25J 11/00* (2006.01)
*B25J 13/00* (2006.01)

(52) U.S. Cl.
CPC ........... *B66B 5/0087* (2013.01); *B25J 11/008* (2013.01); *B25J 13/006* (2013.01); *B66B 5/0025* (2013.01)

(58) Field of Classification Search
CPC .... B66B 5/0087; B66B 5/0025; B25J 11/008; B25J 13/006
USPC ................................................. 187/391, 247
See application file for complete search history.

(56) References Cited

U.S. PATENT DOCUMENTS

| 2019/0248014 | A1* | 8/2019 | Deyle | .................... B25J 13/006 |
| 2019/0352125 | A1 | 11/2019 | Wooten et al. | |
| 2021/0046650 | A1* | 2/2021 | Deyle | .................. G05D 1/0214 |
| 2021/0046655 | A1* | 2/2021 | Deyle | .................... B25J 9/1664 |

(Continued)

FOREIGN PATENT DOCUMENTS

| CN | 110546097 A | 12/2019 |
| CN | 112158691 A | 1/2021 |

(Continued)

OTHER PUBLICATIONS

European Search Report for European Application No. 22210845.8, Date of Search Jun. 6, 2023, 7 pages.

(Continued)

*Primary Examiner* — Erick D Glass
(74) *Attorney, Agent, or Firm* — CANTOR COLBURN LLP

(57) ABSTRACT

Building systems and methods of performing building maintenance operations are described. The systems include a controller configured to receive requests associated with an elevator system of a building. A database having verification procedures associated with the elevator system is provided and the controller is operable to initiate the verification procedures. A robot is configured in communication with the controller and configured to receive instructions from the controller. The instructions may include a portion of a verification procedure, wherein the robot is configured to perform one or more tasks based on the verification procedure. The robot includes at least one sensor configured to collect sensor data. At least one of the controller and the robot are configured to perform an operation in response to sensor data collected by the robot, with the operation being a determination if the elevator system operation is nominal or if further action is required.

19 Claims, 3 Drawing Sheets

(56) References Cited

U.S. PATENT DOCUMENTS

2021/0283777 A1*  9/2021  Gou ........................ B66B 1/468
2022/0033216 A1*  2/2022  Noguchi ............... B66B 1/3461

FOREIGN PATENT DOCUMENTS

| | | |
|---|---|---|
| CN | 112508209 A | 3/2021 |
| EP | 3604193 A1 | 2/2020 |
| JP | 2010189162 A | 9/2010 |
| WO | 2021038806 A1 | 3/2021 |

OTHER PUBLICATIONS

Chinese OA for application CN 202211452836.6, Issued Dec. 18, 2025, 8 pages.

* cited by examiner

300

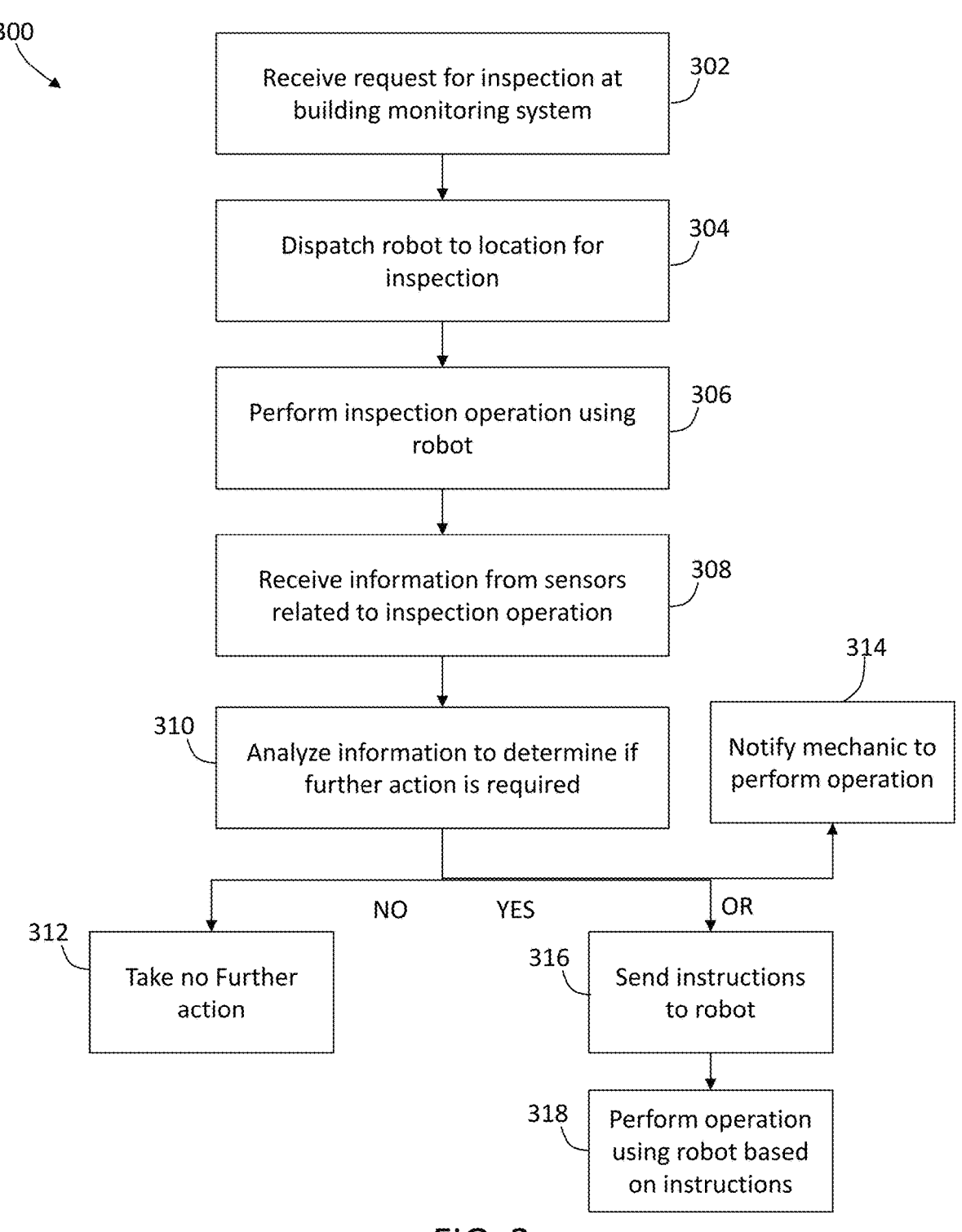

302 Receive request for inspection at building monitoring system

304 Dispatch robot to location for inspection

306 Perform inspection operation using robot

308 Receive information from sensors related to inspection operation

310 Analyze information to determine if further action is required

314 Notify mechanic to perform operation

NO          YES          OR

312 Take no Further action

316 Send instructions to robot

318 Perform operation using robot based on instructions

FIG. 3

ELEVATOR SYSTEMS AND ROBOT OPERATIONS ASSOCIATED THEREWITH

BACKGROUND

Embodiments described herein relate to building systems and, more specifically, to elevator systems and building maintenance operations that incorporate a robot to perform actions associated therewith.

Autonomous mobile robots or service robots are on the rise in a variety of industries including commercial buildings, hospitality, healthcare, and the like. Such robots can perform actions either to replace existing human activity or to supplement such activity by enabling specific tasks or procedures that may be unsafe, difficult to perform, occur in hard to reach locations, or the like, or may be implemented to streamline existing processes. Use of such robots in building maintenance operations may be beneficial.

BRIEF SUMMARY

In accordance with some embodiments, building systems are provided. The building systems include a controller configured to receive requests associated with an elevator system of a building, a database containing one or more verification procedures associated with the elevator system, wherein the controller is operable to initiate one or more of the verification procedures, and a robot configured in communication with the controller and configured to receive instructions from the controller, wherein the instructions include a portion of at least one verification procedure, wherein the robot is configured to perform one or more tasks based on the at least one verification procedure, the robot comprising at least one sensor configured to collect sensor data. At least one of the controller and the robot are configured to perform an operation in response to sensor data collected by the robot, wherein the operation is a determination if the elevator system operation is nominal or if further action is required.

In addition to one or more of the features described above, or as an alternative, further embodiments of the building systems may include that the robot comprises a sensor assembly having one or more sensors selected from optical sensors, infrared sensors, ultraviolet light sensors, chemical sensors, biological sensors, accelerometers, acoustic and/or vibration sensors, temperature sensor, air quality sensors, air pressure sensors, air flow speed sensors, motor current/ feedback sensors, ultrasonic sensors, radar sensors, magnetic sensors, electromagnetic sensors.

In addition to one or more of the features described above, or as an alternative, further embodiments of the building systems may include that the robot is configured to call an elevator car in response to receiving the portion of the at least one verification procedure.

In addition to one or more of the features described above, or as an alternative, further embodiments of the building systems may include that the controller is part of an internet-of-things (IoT) system of the building.

In addition to one or more of the features described above, or as an alternative, further embodiments of the building systems may include that the controller is located at a location remote from the building.

In addition to one or more of the features described above, or as an alternative, further embodiments of the building systems may include that at least one of the robot and the controller are configured to perform a control event comprising the one or more tasks to obtain sensor-detected event information.

In addition to one or more of the features described above, or as an alternative, further embodiments of the building systems may include that at least one of the robot and the controller are configured to perform a correlation between expected result information of the control event and the sensor-detected event information collected by the robot.

In addition to one or more of the features described above, or as an alternative, further embodiments of the building systems may include that the controller is configured to send dispatch instructions to the robot and the robot is configured to travel to a location based on the dispatch instructions.

In addition to one or more of the features described above, or as an alternative, further embodiments of the building systems may include that the robot is configured to place hall or car calls via an elevator dispatch API.

According to some embodiments, methods of performing building maintenance operations are provided. The methods include receiving a request for service associated with an elevator system of a building at a controller, dispatching a robot to a location associated with the request for service, obtaining sensor data with the robot at the location and associated with the request for service, processing the sensor data to determine if an issue with the elevator system is present related to the request for service, and performing a maintenance task in response to the determination of an issue with the elevator system.

In addition to one or more of the features described above, or as an alternative, further embodiments of the methods may include that the maintenance task comprises generating a report regarding the issue with the elevator system.

In addition to one or more of the features described above, or as an alternative, further embodiments of the methods may include that the maintenance task comprises performing a maintenance operation on the elevator system using the robot.

In addition to one or more of the features described above, or as an alternative, further embodiments of the methods may include that the robot is configured to assist a human person in performing a maintenance operation on the elevator system.

In addition to one or more of the features described above, or as an alternative, further embodiments of the methods may include performing continuous monitoring of the elevator system with the robot.

In addition to one or more of the features described above, or as an alternative, further embodiments of the methods may include that the robot is configured to call and use an elevator car of the elevator system during the continuous monitoring of the elevator system.

In addition to one or more of the features described above, or as an alternative, further embodiments of the methods may include that the sensor data is associated with a leveling operation of an elevator car at a landing of the elevator system.

In addition to one or more of the features described above, or as an alternative, further embodiments of the methods may include that the sensor data is obtained by the robot from the elevator system, wherein the sensor data is obtained by sensors of the elevator system.

In addition to one or more of the features described above, or as an alternative, further embodiments of the methods may include that the controller is one of part of an IoT system of the building or in communication with the IoT system of the building.

In addition to one or more of the features described above, or as an alternative, further embodiments of the methods may include performing an inspection operation with the robot to obtain the sensor data.

In addition to one or more of the features described above, or as an alternative, further embodiments of the methods may include that the processing of the sensor data is performed on the robot.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

The subject matter which is regarded as the invention is particularly pointed out and distinctly claimed in the claims at the conclusion of the specification. The foregoing and other features and advantages of the invention are apparent from the following detailed description taken in conjunction with the accompanying drawings in which:

FIG. 3 is a flow process for performing a building maintenance operation in accordance with an embodiment of the present disclosure.

DETAILED DESCRIPTION

Figure 1:
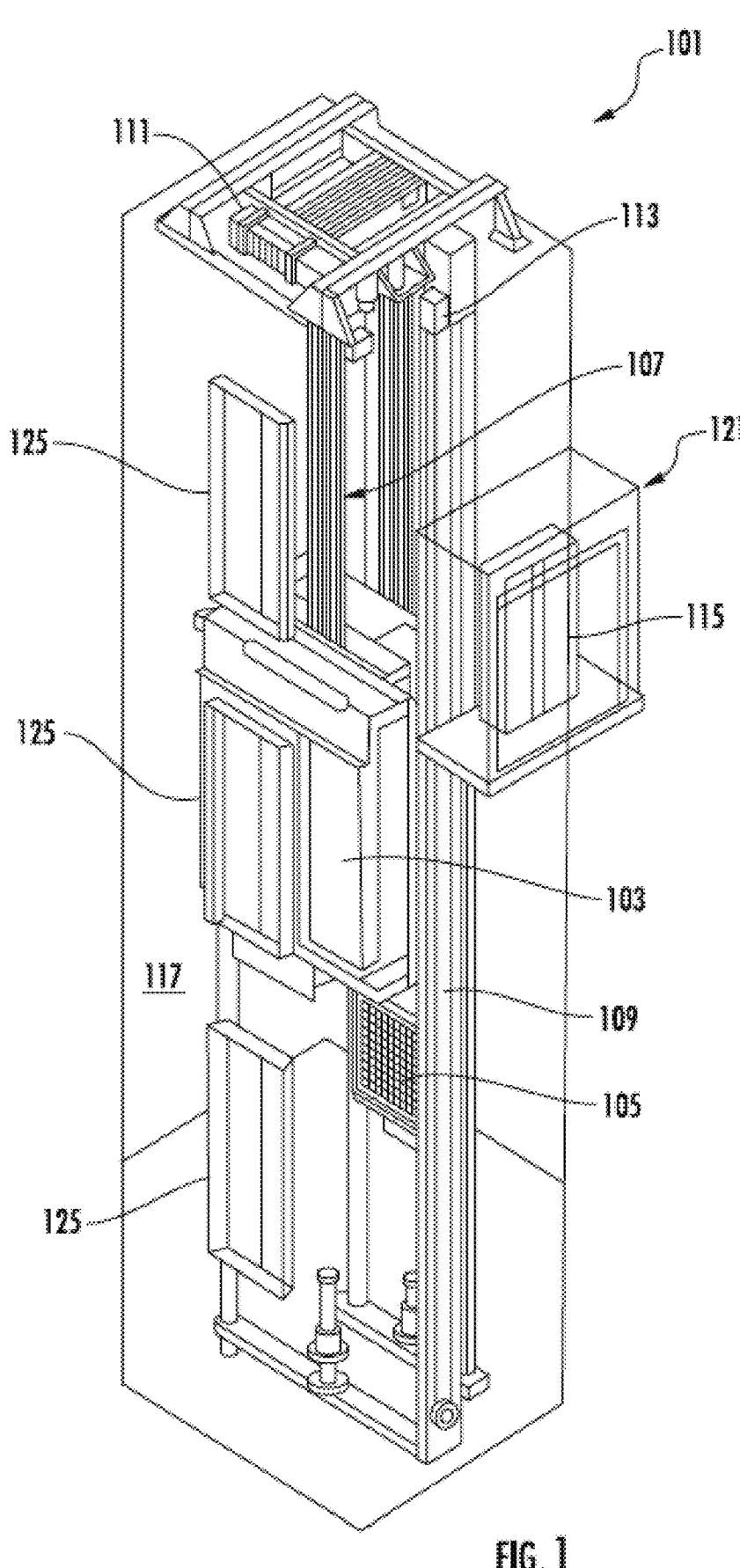
FIG. 1 is a schematic illustration of an elevator system that may employ various embodiments of the present disclosure.

FIG. 1 is a perspective view of an elevator system 101 including an elevator car 103, a counterweight 105, a tension member 107, a guide rail 109, a machine 111, a position reference system 113, and an elevator controller 115. The elevator car 103 and counterweight 105 are connected to each other by the tension member 107. The tension member 107 may include or be configured as, for example, ropes, steel cables, and/or coated-steel belts. The counterweight 105 is configured to balance a load of the elevator car 103 and is configured to facilitate movement of the elevator car 103 concurrently and in an opposite direction with respect to the counterweight 105 within an elevator shaft 117 and along the guide rail 109.

The tension member 107 engages the machine 111, which is part of an overhead structure of the elevator system 101. The machine 111 is configured to control movement between the elevator car 103 and the counterweight 105. The position reference system 113 may be mounted on a fixed part at the top of the elevator shaft 117, such as on a support or guide rail, and may be configured to provide position signals related to a position of the elevator car 103 within the elevator shaft 117. In other embodiments, the position reference system 113 may be directly mounted to a moving component of the machine 111, or may be located in other positions and/or configurations as known in the art. The position reference system 113 can be any device or mechanism for monitoring a position of an elevator car and/or counter-weight, as known in the art. For example, without limitation, the position reference system 113 can be an encoder, sensor, or other system and can include velocity sensing, absolute position sensing, etc., as will be appreciated by those of skill in the art.

The elevator controller 115 is located, as shown, in a controller room 121 of the elevator shaft 117 and is configured to control the operation of the elevator system 101, and particularly the elevator car 103. For example, the elevator controller 115 may provide drive signals to the machine 111 to control the acceleration, deceleration, leveling, stopping, etc. of the elevator car 103. The elevator controller 115 may also be configured to receive position signals from the position reference system 113 or any other desired position reference device. When moving up or down within the elevator shaft 117 along guide rail 109, the elevator car 103 may stop at one or more landings 125 as controlled by the elevator controller 115. Although shown in a controller room 121, those of skill in the art will appreciate that the elevator controller 115 can be located and/or configured in other locations or positions within the elevator system 101. In one embodiment, the controller may be located remotely or in the cloud.

The machine 111 may include a motor or similar driving mechanism. In accordance with embodiments of the disclosure, the machine 111 is configured to include an electrically driven motor. The power supply for the motor may be any power source, including a power grid, which, in combination with other components, is supplied to the motor. The machine 111 may include a traction sheave that imparts force to tension member 107 to move the elevator car 103 within elevator shaft 117.

Although shown and described with a roping system including tension member 107, elevator systems that employ other methods and mechanisms of moving an elevator car within an elevator shaft may employ embodiments of the present disclosure. For example, embodiments may be employed in ropeless elevator systems using a linear motor to impart motion to an elevator car. Embodiments may also be employed in ropeless elevator systems using a hydraulic lift to impart motion to an elevator car. FIG. 1 is merely a non-limiting example presented for illustrative and explanatory purposes.

Autonomous mobile robots or service robots may be used in commercial buildings. Such uses may be related to hospitality (e.g., for food and package delivery, concierge and guest services, and the like), healthcare (e.g., for medicine and supply delivery and service augmentation), and the like. Additionally, robots and other autonomous systems (e.g., drones or the like) may be used for inspection, safety, and/or service purposes. Robots may be used with elevator systems of buildings for the purpose of inspection, repair, maintenance, monitoring, and the like.

For example, robots can be used for the purpose of verification of certain elevator system issues. In some such configurations, the robot(s) may be configured to operate as part of a technical partnership between the robot(s) and an IoT (internet-of-things) monitoring system associated with an elevator system. In some such applications, the IoT monitoring system may be configured to detect an anomaly of the elevator system that may be an early indicator of an issue with elevator equipment and/or operation. In response to such detection, a robot may be used (e.g., dispatched) to inspect and/or verify the anomaly and/or the nature of such anomaly. The robot may be configured to place hall or car calls via an elevator dispatch application programming interface (API), in response to the anomaly detection. The robot may call an elevator car through direct interface or communication with the elevator dispatch API and may not need to directly (physically) interact with the elevator system (such as pressing a hall call button). The robot may then travel to a position such that the robot can perform a verification or data gathering task. That is, the robot may communicate and/or interact with the elevator system to call an elevator car and travel in such elevator car to a designated location to perform an inspection or other task. In some embodiments, alternatively or in combination, the controller may be configured to place hall or elevator car calls on behalf of the robot.

In some applications, the robot(s) may be configured to place hall or car calls as part of a routine task cycle for gathering data on certain equipment health indicators. In some such applications, the robot(s) may be configured to analyze vibrations of an elevator door via an on-board camera or other sensor of the robot. In such gathering data applications, the robot(s) may be configured to perform a series of monitoring activities (e.g., visual, vibration, etc.) associated with the elevator system. This process can help determine whether an action is needed to resolve an issue. For example, a robot may be configured to trigger a notification or directly place a service request via the elevator IoT monitoring system, through a work order management system of a building, or the like. The robot may also be configured to collect data associated with an inspection and service request to provide additional information beyond a mere call for service to be performed.

Figure 2:
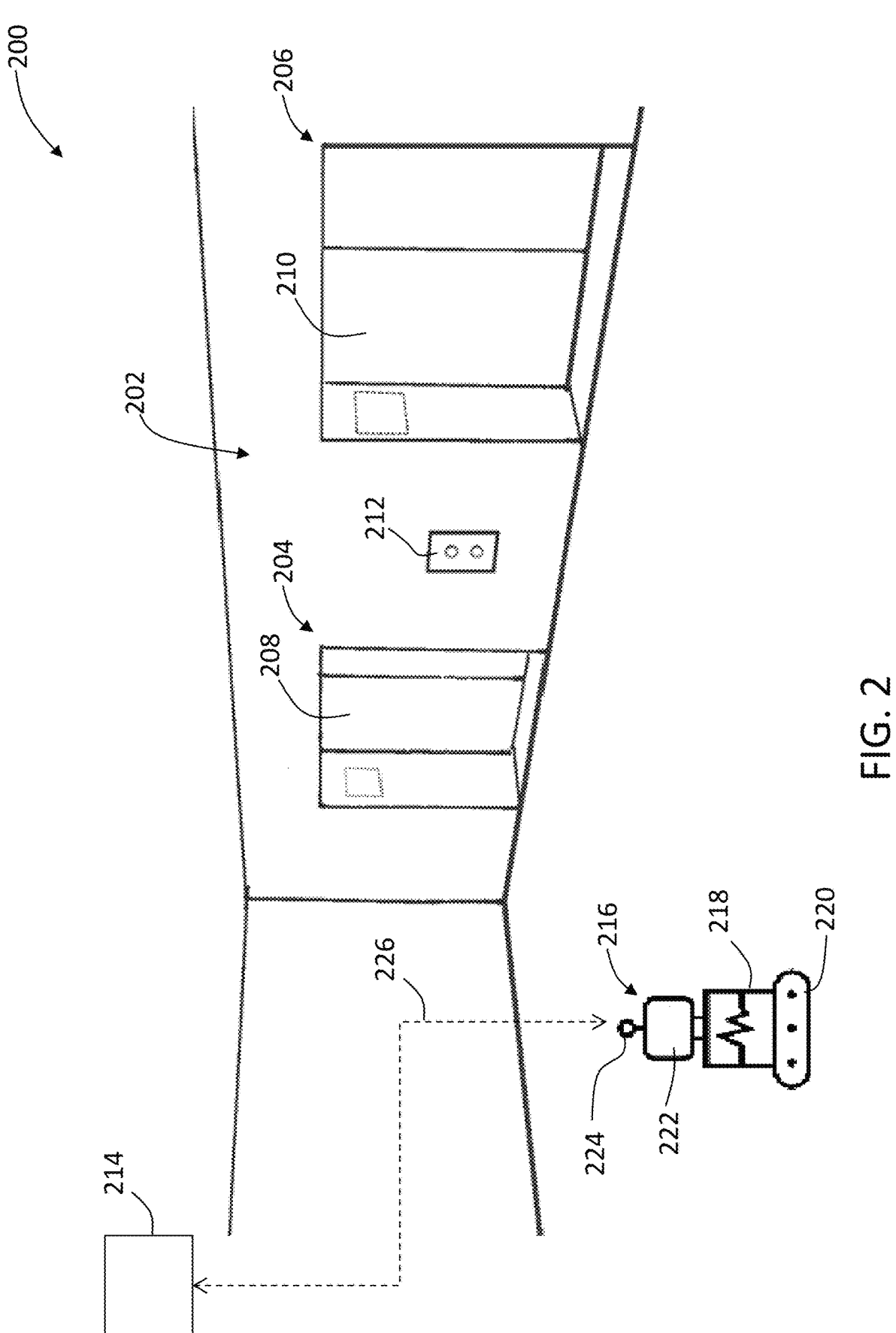
FIG. 2 is schematic illustration of a building system having a robot, controller, and elevator system in accordance with an embodiment of the present disclosure.

Referring now to FIG. 2, a schematic illustration of a building system 200 in accordance with an embodiment of the present disclosure is shown. FIG. 2 illustrates one landing of an elevator system 202 of the building system 200, having two elevators 204, 206 with respective elevator landing doors 208, 210. The elevator system 202 may include a plurality of landings with one or more elevator shafts and associated elevators configured to provide access to and transportation between the landings of the elevator system. The elevators 204, 206 may each be arranged similar to the elevator system 101 shown and described with respect to FIG. 1. The elevators 204, 206 may be called to each landing of the elevator system 202 using a hall call panel 212 located at each landing. When an elevator car of the respective elevator 204, 206 reaches a landing where a request was made (e.g., either at the landing or from within the elevator car), the respective elevator landing door 208, 210 will open to permit entry and exiting to and from the elevator car, as will be appreciated by those of skill in the art.

The building system 200 also includes a controller 214. The controller 214 may be part of a building-integrated system that is configured to monitor various aspects of a building, including, but not limited to, the elevator system 202 (e.g., a building management system). In some configurations, the controller 214 may be operably connected to or part of a building monitoring system and/or an internet-of-things (IoT) system that incorporates a network and associated communication lines (e.g., wired and/or wireless) for obtaining information from a distributed set of sources (e.g., sensors, monitoring systems, control systems, HVAC systems, elevator systems, security systems, lighting systems, etc.). In accordance with this illustrative embodiment, the building system 200 also includes at least one robot 216. The robot 216 may be an autonomous or semi-autonomous system that is configured to travel throughout the building and perform tasks, such as inspection, monitoring, data collection, perform maintenance, etc. In accordance with some embodiments, the controller 214 may be located onsite and within or part of the same building as the robot 216. In other embodiments, the controller 214 may be part of a datacenter or the like that is offsite or remote from the building having the robot 216. In still further embodiments, the controller 214 may be a cloud-based solution that is distributed in one or more locations. Further still, in some embodiments, the controller 214 may be part of or implemented on a mobile or portable device or the like.

The robot 216 includes a main body 218 that houses various electronics and/or mechanism systems, such as for locomotion, data collection, interaction with external items, and the like. The robot 216 includes a means for locomotion 220, such as treads, wheels, roller balls, articulated legs/arms, or the like. The robot 216 includes a sensor assembly 222, which can include various sensors, appendages, tools, processing components, and the like. The robot 216 includes a communications element 224 that is configured to communicate with the controller 214 along a communication line 226. It will be appreciated that the robot 216 is merely schematically shown as a cartoon representation with discrete parts and that the robots of the present disclosure may take any structural form or arrangement of components (e.g., all or some integrated into a single housing or the like). The communication line 226 may be a wireless communication connection and/or the robot 216 may be configured to hardwire connect to a communication port or line to enable communication between the robot 216 and the controller 214. In some embodiments, the controller 214 may be housed within and part of the robot 216 (e.g., onboard), in such configurations, the processes and operations described herein may be performed onboard the robot, reducing the amount of communication. However, it will be appreciated that even when the controller 214 is integrated into the robot 216, communication with the elevator system is still performed, as described herein.

The robot 216 and/or the controller 214 can include electronics that include processor(s), memory, communication module(s), etc. as will be appreciated by those of skill in the art. The robot 216 can be configured to communicate with one or more system components, such as computers, controllers, etc. of the controller 214. The system components can include processors, memory, communications modules, etc. As noted, the communication between the robot 216 and the controller 214 can be by wired or wireless communication, through the internet, direct connection, etc. as will be appreciated by those of skill in the art.

The robot 216 and the controller 214, in accordance with embodiments of the present disclosure, can communicate with one another along the communication line 226. For example, in some configurations, the two components (i.e., the robot 216 and the controller 214) may communicate with one another when the robot 216 is located in proximity to an access or connection point (e.g., wireless access point or wired port) and/or through network communication. Wireless communication networks can include, but are not limited to, Wi-Fi, short-range radio (e.g., Bluetooth®), Zigbee, ZWave, near-field infrared, cellular network, etc. In some embodiments, the controller 214 may include, or be associated with (e.g., communicatively coupled to) one or more networked system elements, such as computers, routers, network nodes, etc. The networked system elements may also communicate directly or indirectly with the robot 216 using one or more communication protocols or standards (e.g., through the communication line 226).

For example, the controller 214 or a component thereof can communicate with the robot 216 using near-field communications (NFC) (e.g., communication line 226) and thus enable communication between the robot 216 and the controller 214. Such technologies that allow communication can provide users and the system(s) described herein time to perform the described functions. In example embodiments, the robot 216 may communicate with the controller 214 over multiple independent wired and/or wireless networks. Embodiments are intended to cover a wide variety of types of communication between the robot 216 and the controller 214, and embodiments are not limited to the examples provided in this disclosure.

The communication line 226 may be a communication network. Such network may be any type of known communication network including, but not limited to, wide area networks (WAN), local area networks (LAN), global networks (e.g., Internet), virtual private networks (VPN), cloud networks, cellular networks, intranet, etc. Such network may be implemented using a wireless network or any kind of physical network implementation known in the art. The robot 216 and potentially other robots and/or other devices may be coupled to the controller 214 through one or more networks (e.g., a combination of cellular and Internet connections) so that not all communication connections may be the same (or used at the same time). In one non-limiting embodiment, the network (e.g., communication line 226) is the Internet and one or more of the robots 216 are configured to communicate with the controller 214 through the network (e.g., using communications element 224).

The controller 214 may include a control component (e.g., single computer or server, distributed computing system, remote networked system, etc.) that is configured to receive requests for verification and/or inspection. The requests may be received from the robot 216 or from other sources, such as personnel submitted requests (e.g., maintenance), passenger or patron submitted requests (e.g., users of the elevator system 202), or from other sources. The controller 214 may also include a memory or other digital storage (local or remote from the building) that contains a database having one or more verification procedures (e.g., a sequence of tasks). The communication line 226 provides for a communication channel between the controller 214 and the robot 216.

As noted, the controller 214 may include or be configured to access a database containing one or more verification procedures. The verification procedures may be a series of executable commands or sequences of tasks to be performed by the controller and/or the robot. For example, in some embodiments, the verification procedures can include data analysis at the controller or the robot. Further, such verification procedures may include instructions to be transmitted to the robot to be carried out or performed by the robot. Such instructions can include location data (e.g., where the robot should go) and task data (e.g., executable instructions to perform an action). As such, the robot may travel and perform a task in response to receiving one or more instructions that may be part of a verification procedure. The tasks may include data collection using one or more sensors of the robot and/or the robot interfacing with other systems to download or obtain data and information from such other systems.

In operation, the robot 216 may be configured to collect sensor data using the sensor assembly 222. The robot 216 may alternatively or additionally be configured to obtain sensor data from other sensors or sources remote from the robot 216. For example, through a wired or wireless connection, the robot 216 may be configured to obtain sensor date from a counter or gage on the elevator and/or in a machine room, to obtain information regarding operation of the elevator or the like. In some configurations, the robot 216 may be configured to interface with a computer system, monitoring system, sensing system, or the like, associated with the elevator (e.g., in-cab monitoring system that collects data regarding operation of the elevator car), or the like. As such, the sensor data is not limited to only data collected by sensors of the robot 216, but include both directly obtained sensed information (e.g., using sensor assembly 222) or obtained indirectly from other systems associated with the elevator system. The robot 216 may thus be configured to transmit or otherwise communicate information from the robot 216 to a central location for processing of such information. The controller 214 may also be operably connected to and/or in communication with the elevator system 202 (e.g., an elevator controller). From this connection, the controller 214 may be configured to obtain information directly associated with the elevator system 202 (e.g., sensors on elevator cars, elevator motor or machine, etc.). The controller 214 may be configured to obtain the collected information from the robot 216 (e.g., sensor data) and the elevator system 202 (e.g., elevator data) to determine if elevator operation is nominal or requires further action.

The sensor assembly 222 of the robot 216 may include one or more sensors that are configured to enable detection and/or monitoring of systems and components associated with the elevator system 202. For example, the sensor assembly 222 may include, without limitation, optical sensors, infrared sensors, ultraviolet light sensors, chemical sensors and/or biological sensors (e.g., to detect oil, chemicals, or the like), accelerometers, acoustic and/or vibration sensors, temperature sensor, air quality sensors, air pressure sensors, air flow speed sensors, motor current/feedback sensors, ultrasonic sensors, radar sensors, magnetic sensors, electromagnetic sensors, and the like. Optical sensors and the like may be configured to detect lighting associated with the elevator system 202 (e.g., in-car lights, lights on operating panels, lights at landings, etc.). Such optical sensors may also be configured video analytics, such as a video for damage analysis, identifying debris, spills, a passed out passenger, left behind items, or the like. Accelerometers and similar sensors may be used to detect a level of an elevator car with a landing (e.g., for entering/exiting), smoothness of elevator ride, detecting stopping/starting acceleration of an elevator car, or the like. Air quality sensors may be configured to monitor temperature, odors, ventilation (e.g., $CO_2$), smoke, the presence of chemical and/or biological agents, and the like. Ultrasonic or radar (e.g., range detection) may be used to determine if the elevator car is level with a landing or not and/or may be used to detect objects left behind in elevator car or at a landing. The above description provides a limited number of examples of types of sensors and use thereof. It will be appreciated that additional sensors and/or functionality may be implemented without departing from the scope of the present disclosure.

The robot 216 may be configured or programmed to travel through a building and perform inspections and/or tasks. Through the communication line 226, the robot 216 may be configured to call an elevator car to a particular landing. The call may be placed from the robot 216 to the controller 214 which in turn interfaces with an elevator controller to send an elevator car to a requested landing. In other embodiments, the robot 216 may directly make an elevator call through the communication line 226 if such communication line is connected directly to the elevator controller. In still other embodiments, in combination or alternatively, the robot 216 may request an elevator car using the hall call panel 212 or a car operating panel (if the robot is already within an elevator car and a destination landing is selected).

Although FIG. 2 illustrates a single robot 216, this is merely for schematic and illustrative purposes. It will be appreciated that references to "robot 216" may refer to a single robot or may refer to multiple robots that are associated with an elevator system or building or the like. As such, the term "robot" as used herein is not limited to a singular robot, but rather refers to the functions and capabilities of one or more robots. In some such configuration with multiple robots, each robot may be the same or substantially similar, and thus may perform the same or similar tasks. In other embodiments, some or all of the robots may be different from each other robot, where specialize tasks or functions may be performed by specific unique robots. In some embodiments, such as when the controller (e.g., controller 214) is integrated into the robot, the processing and decision making may be distributed across the group of robots. Alternatively, in a group of robots with an onboard controller, in some embodiments, a primary or control robot may be used, and other robots are controlled or directed through the control robot.

Turning now to FIG. 3, a flow process 300 for performing building inspection and maintenance associated with an elevator system of the building in accordance with an embodiment of the present disclosure is shown. The flow process 300 may be performed using a building monitoring system, elevator system, and robot, similar to the configuration shown and described above. The robot may be an autonomous or semi-autonomous system that is capable of moving throughout a building and interact with system of the building, including, but not limited to, an elevator system. The robot may be a general purpose robot configured to perform a variety of tasks associated with the building, a dedicated robot configured specifically for tasks and operations associated with an elevator system or may be a robot that is not directly associated with the building but brought on-site for one or more purposes, including performing parts of the flow process 300. The building monitoring system that implements a portion of the flow process 300 may be an IoT (internet-of-things) monitoring system associated with the building, and specifically associated with the elevator system of the building.

At block 302, the building monitoring system receives a request for inspection. In some embodiments, the request for inspection may be received from a mechanic or other personnel. In some embodiments, the request may be sourced from a customer request (e.g., passenger of the elevator system) which may be input from the elevator system, through a submission portal of the building, or the like. In some embodiments, the request may be sourced from a robot that is configured to perform general inspection and/or monitoring. In some embodiments, the robot used for this initial request may be the same as the robot that is used in the rest of the flow process 300. In other embodiments, the robot generating the request at block 302 may be different from the robot that is used in implementation of the flow process 300, as described below. It will be appreciated that the request for inspection may be derived from other sources, and the above examples are merely provided for illustrative and explanatory purposes. For example, in some embodiments, the request may be self-generated within the building monitoring system. For example, in a building monitoring system configured as an IoT system, the building monitoring system may include a central controller or processor that receives information from a distributed network of sensors, detectors, and building systems. When information from these distributed components indicates that an issue is present or information indicative of a precursor of an issue, the building monitoring system may be configured to generate a request to be sent to a robot to perform a task associated with the request.

At block 304, the building monitoring system will communicate with a robot to dispatch the robot to a location associated with the request. The dispatch instructions may be entirely sourced from the building monitoring system, such as including instructions on how the robot performs and acts, and all supporting operations are sourced from instructions received at the robot from the building monitoring system. In other embodiments, the dispatch may be a command from the building monitoring system sent to the robot, and then the robot performs onboard processing to carrying out the operations of the dispatch command, such as controlling self-locomotion and/or calling an elevator car to travel to a different landing/floor to reach the location where an inspection is to be carried out.

At block 306, the robot will perform an inspection of the requested component, system, or location designated in the dispatch request. Similar to the travel by the robot, in some embodiments, the inspection performed by the robot may be carried out pursuant to instructions received from the building monitoring system and/or may be carried out pursuant to instructions stored on internal or onboard memory of the robot. The inspection may be performed using one or more sensors of the robot, such as the sensors described above.

At block 308, information related to the inspection may be received from sensors (e.g., onboard the robot and/or from other non-robot-based sensors). In some embodiments, the robot will transmit or communicate data associated with the inspection to the building monitoring system. In other embodiments, the robot may directly receive the sensor data, both collect by the robot directly (e.g., sensor assembly) and indirectly (e.g., through communication with other remote sensors).

At block 310, the sensor information is analyzed. In some embodiments, the analyzing may be performed by a building management system, building monitoring system, or associated computing elements, that receive information from the robot to determine if further action is required. In some embodiments, the analyzing may be performed onboard the robot (e.g., when the controller is integrated into the robot).

As noted, in some embodiments, the steps of block 308, 310 may be performed onboard the robot rather than requiring transmission and remote processing of the information. That is, in some embodiments, the robot may be programmed to obtain the data from the sensors and then analyze the data immediately onboard the robot, thus negating the need for additional communication.

Based on the analysis of the collected information/data at block 310, a determination is made if further action is required. If it is determined that there is no issue, the flow process 300 continues to block 312 where no further action is taken. However, if it is determined that some type of action is required, the flow process continues. Depending on the nature of the system, the robot, and/or the required task, the flow process 300 may continue in one of two different ways.

First, if the robot cannot perform any further tasks beyond the inspection/data collection, at block 314, the robot may communicate to the building monitoring system to request a mechanic or other personnel (or another robot) to perform a maintenance operation. This may also be the case if the robot is configured to perform tasks but may not be capable of performing a specific required task and thus a human or other specialized robot may be required. In some such embodiments, the request for a mechanic or human intervention can include supporting information (e.g., data collected by the robot) that may aid a human in responding to the request. As such, in some embodiments, a simple request may be generated, indicating the action to be taken or required. In other embodiments, a more comprehensive request may be generated where the request includes some or all of the data associated with the identified issue, as collected by the robot (e.g., from an onboard sensor assembly and/or from other sensors the robot collected data from).

Alternatively, if the robot is capable of performing an appropriate action associated with the determined action for proceeding. That is, at block 310 when it is determined that further action may be required, the building monitoring system may be configured to determine an appropriate action to be taken. This action can be sent to the robot in the form of one or more commands and/or instructions, at block 316. Alternatively, the operation at block 316 may include an internal look-up or other processing performed by the robot directly (e.g., controller of system is onboard the robot). As such, the sending of instructions may be sending from a database onboard the robot to a processor for processing of such instructions. The robot may then perform the instructed operation based on the commands and/or instructions, at block 318.

As noted above, maintenance and/or inspection requests may be received from analysis of IoT data or from a human-derived request (e.g., customer, passenger, mechanic, etc.). The analysis of the request may, in part, be based on comparing collected data against a database of normal operating parameters or the like. Such a database may be located anywhere as long as such database is accessible by the building monitoring system and/or the robot. For example, such database(s) may be stored in cloud storage (e.g., distributed/networked storage), in a machine room of the building (e.g., elevator machine room), in on-site or offsite servers, in the robot itself (e.g., onboard digital memory), or the like.

The robots described herein and employed with embodiments of the present disclosure may include various features and/or functionalities to perform the tasks described herein. For example, the robots may be self-propelled or mobile. The locomotion of the robots may be through self-control and driving a motor or the like that drives wheels, treads, legs, or the like to move the robot throughout the building. The robot may include onboard storage with a digital map or layout of the building, or, in some embodiments, the robot may be configured with optical sensors (or the like) to enable self-locomotion based on observed conditions from such onboard sensors. The robot will include various sensors for performing requests tasks or actions, such as inspection and/or to perform a task such as operating a tool or interacting with components of the elevator system. The robot will also include an interface for communication with the building monitoring system, and thus can receive data from a database and/or instructions from the building monitoring system.

The robot may be configured to signal to the building monitoring system an outcome of a commanded task (e.g., inspection and/or actual mechanical operation). That is, in addition to receiving instructions or commands from the building monitoring system and/or performing tasks/operations stored on onboard memory, the robot may be configured to determine when a task is complete and transmit information related to the completed task to the building monitoring system. In an inspection-only operation, the indication of a task complete may be the transmission of the inspection data to the building monitoring system, where further processing may be performed (either locally or remotely). In an action-operation, upon completion of a process associated with the requested action, the robot may notify the building monitoring system that the process is complete.

Such operations may include, for example, the robot positioning one or more sensors relative to an area of inspection. Such movement of the sensors may be by moving the robot to a favorable position or using an extendable/articulatable arm or the like that includes one or more sensors or related components. The data collected from the sensors may be analyzed directly onboard the robot or the collected data may be transmitted elsewhere (e.g., to the building monitoring system or other processing system(s)). In some configurations, the data collection and analysis may be over a duration rather than a single snapshot of collected data. For example, the robot and/or building monitoring system may be configured to analyze a time interval between events (e.g., door close command and door fully closed signal, monitor time-to-level of an elevator car, etc.).

As noted above, in some embodiments, the robot may be configured to perform procedures described herein without the presence of a human (e.g., mechanic). In other embodiments, the robot may be configured to aid or assist a human counterpart. As such, the robot may be configured to work as a mechanic helper/assistant.

The robot may be configured to travel throughout a building and interact with and/or communicate with one or more static sensors. For example, an elevator system may include various sensors that are configured to monitor performance of one or more aspects of the elevator system. Such sensors may be related to elevator door operation, elevator travel speed (e.g., speed, acceleration, deceleration), leveling, braking, vibrations, sounds, lighting, environmental aspects (e.g., HVAC, air quality, etc.), elevator operating panels (e.g., at landings, in elevator car, etc.), and the like. The robot may be configured to travel around and obtain (e.g., receive or download) data from these sensors. The collected data may be analyzed onboard the robot and/or may be communicated back to the building monitoring system.

In some embodiments, the robot and/or the building monitoring system may be configured to perform a correlation or check between control events and sensor-detected events. In accordance with some embodiments, the control events may include, without limitation, scheduled checks of various components or features of an elevator, such as lights associated with button pressures, checking internal elevator cab lighting, airflow, speakers, display screens, and the like. The control events may include predefined expected outcomes or results, related to the specific components or features being inspected.

The sensor-detected events may include, without limitation, monitoring a speed of door open-close operation as compared to prior monitored or detected states. Similarly, interacting with an elevator panel and observing responses to such interaction may be performed (e.g., pressing buttons and monitoring for light-up of the buttons). That is, the sensor-detected events represent the information and/or actions collected by or performed by the robot. As such, the robot may be configured to perform predefined flow processes. The flow processes may include instructions or the like to control or have the robot position, interact, and sense, detect, or monitor based on the positioning and interaction. In some embodiments, such flow processes may be a predefined, programmed, predetermined set of tasks or the like. Each task may include a series of branching logics, such as Yes-No logics. From this, the robot may be configured to generate a report or notification (e.g., record defective button, generate request for mechanic, etc.). As the robot performs the flow process logic, the robot may be configured to perform a series of different logic trees or the like. For example, the robot may be configured to perform basic trouble shooting processes, to identify and/or correct issues associated with the elevator. That is, the logic and processes of the robot may be configured to identify a problem and work through flow processes to identify a cause of the problem, perform a corrective action, or generate a request for human action, or the like.

In one non-limiting example, the "control event" is an explicit action taken by the robot. For example, the robot may be configured to test the lights on a car operating panel and associated buttons by positioning the robot in the elevator car relative to the car operating panel and pressing each button. The control event can include, such as stored on a memory or the like, expected result information. The robot is configured to perform a correlation or check with respect to a set of expected responses (part of the control event) and sensor-detected events (information associated with actual data collected by the robot). For example, the outcome of pressing the button may be that the button lights up (luminance at the position of the button exceeds a certain threshold). This is a possible sensor-detected event where the inspection task is successful. That is, the control event includes information on the minimum threshold of luminance of the light, and the sensor-detected event indicated that such minimum luminance was detected. Another outcome is that the button does not light up or is below the minimum luminance, and thus may be indicative of a failure or the like. For either outcome, the robot may be configured to log the result in a report (e.g., a periodic inspection report) available for a building manager (e.g., human) to review. The human review of the robot-collected report may be performed to ensure that the robot-based inspection was completed and everything is functioning as expected. Alternatively, if a report indicates a failure of any check/correlation, the human reviewer may call for a mechanic of the issue to be addressed. Further still, rather than a report, the robot may be configured to make or submit a maintenance request through the building management system and/or connection between the robot and systems of the building or the like.

In another non-limiting example, the robot may be programmed to follow various logic programs (e.g., of varying complexity), such as following a flowchart where a first control event may be a task to test if a particular operation is performing within a nominal specification and, if the sensor-detected event confirms such nominal operation, that task is deemed complete and the robot can proceed to another control event (e.g., another task). On the other hand, if the sensor-detected event indicates that the operation is not performing within the nominal specification, the robot can follow a branch in a flow process to try to narrow the cause of the unsuccessful test.

In one non-limiting example, an elevator system has two sets of elevator doors, the elevator car door which faces the interior of the cab (and is part of the elevator car) and a landing door at each floor which faces the elevator lobby inside the building. Only the elevator car door has a motor, while the landing door is passive and only moves because it is mechanically coupled with the elevator car door when the elevator car is located at a specific landing door. A control event for a robot may be to test that the doors (both car and landing) are operating smoothly by measuring the time duration of the door opening operation (e.g., no more than 2.2 seconds) and the duration of the door closing operation (e.g., no more than 2.7 seconds). The robot may be configured to position itself within the elevator car and optically or otherwise observe the door open/close operation at one or more floors (e.g., by interacting with and using a car operating panel, through direct communication with an elevator controller, such as by wireless communication, etc.). If the test fails, the failure could either be due to a problem on the car door side (e.g., motor issue, belt drive issue, friction in the car door panels, etc.) or a problem on the landing door side (e.g., friction on the landing door due to a door gib jamming against debris in the track at the bottom of the door panel, etc.). To confirm that it might be a problem with the landing door, a recourse action in the flow chart/process may be for the robot to command the car to move to a different landing and re-run the same test. If the test again fails, this points to a problem in the elevator car door, and thus additional floors/landings may be traveled to for additional confirmation. On the other hand, if the test is now successful, this suggests that the problem is localized to the floor of the first test. Based on the outcome, a report may be generated, a notification may be sent, or the robot may be configured to perform direct mitigation and corrective actions. For example, if it is determined that the issues is with the landing door, and a possible failure may be due to debris in the sill or door gib, the robot may be configured to blow air through the tracks to dislodge the debris, or a mechanical solution such as using a robot arm or the like to physically remove debris or the like. After performing such direction action, the robot may be configured to perform the correlation check again, by testing and measuring operation of the door open/close operation to see if the issue is corrected. If the issue is not correct, then a report or alert may be generated, or other direct corrective action may be taken.

In some embodiments, the robot may be configured and programmed to be substantially autonomous both in terms of locomotion and in performing tasking. For example, the sensors of the robot may be configured to actively (e.g., continuous or at intervals) collect and analyze data (e.g., onboard or transmitted to a building monitoring system for analysis). The robot may also be configured or programmed to respond to conditions that are detected or observed by the sensors and adjust the tasks the robot performs based on such obtained information. That is, the robot may be configured to do more than merely follow a checklist or set of instructions, but rather may be configured to adaptively adjust based on real-time data collection.

As noted above, a controller that is remote from the robot may be incorporated into embodiments of the present disclosure. The controller may be configured as a module of larger system (e.g., building integrated system or IoT system) or may be in communication with such larger system. In some embodiments, IoT data is obtained from one or more sources (e.g., sensors, building systems, or the like) and such IoT data may be analyzed for detection of anomalies and/or potential issues associated with the monitored systems. When an anomaly or issue is detected, instructions (e.g., a request) may be sent to a controller or generated within the controller if the controller performs the data analysis. The request may be generated in response of an anomaly detection, based on diagnostic analysis of performance data (e.g., associated with operation of an elevator system), or the like. The analysis may be analyzing data over time and comparing against a baseline operation, may be based on comparison to a lookup table or the like, may be based on machine learning detection of anomalies and/or issues, or may be based on other criteria as will be appreciated by those of skill in the art. When collected data is stored and/or compared against known data, the stored data (collected or known) may be housed onsite (e.g., on the robot or a memory of the controller, memory of a building monitoring system, etc.) or offsite (e.g., cloud-based storage or the like).

The robots described herein, as noted above and in some embodiments, may be dedicated or specialized robots associated with an elevator system of a building. In other embodiments, the robot may be associated with the building generally rather than specifically to the elevator system or even a specific elevator. Further still, in other embodiments, the robot may be a specialized robot not associated with the building or elevator system, but rather configured to perform a specialized task and thus may be brought onsite for the specific purpose to carry out a predetermined task (e.g., specialized diagnostics, specialized maintenance activities, etc.).

The tasks performed by the robots may be ones that are difficult for a human to carry out. Such tasks may be unsafe for various reasons (e.g., requiring access to an elevator shaft outside of an elevator car), may be tedious or repetitive and thus not justify costs and time associated with human performance, and/or may be tasks that require interfacing with a building or elevator system that is not typically possible for human actors (e.g., interfacing directly with elevator controller for calls and cancelling of calls). Unsafe conditions for human action may be actions that require access to an elevator shaft outside of an elevator car, may be required during movement of the elevator car, or may be so tedious and repetitive that a mechanic's attention may falter. Additionally, certain tasks may require less skill or training than necessary for a technician, and thus the costs and time associated with human action may not be justified. Examples of such tasks may include, for example and without limitation, analyzing equipment at one location in the building, that needs to be manipulated via an interface situated elsewhere in the building; positioning a sensor in an optimal place to capture data, that a human may struggle to do, such as in a small space, or in an unsafe area such as a hoist way; performing the same task, the same way at the same time, in different locations or even different buildings; repeating the exact same task repeatedly, at a high level of precision; and performing a task under difficult conditions, such as in the dark or in a place with high wind. These examples of potentially unsafe and/or difficult tasks for humans may be replaced by performance using a robot and robotic system, as described herein.

In one example, the robot may be dispatched by the controller to travel to a specific location to perform an inspection or otherwise interact with the elevator system, and the controller may then be configured to perform a responsive action, such as adjusting or causing adjustment to aspects of the elevator operation. For example, the robot may be dispatched to a specific landing to check the status or operation of the landing doors. If an issue with the landing doors is detected by the robot, the controller may be configured to ensure that an elevator car does not stop at the landing that has the issue. The alternative may also be true. The controller may be configured to monitor the electrical systems of an elevator and upon detection of any issues may be configured to confirm the issue and/or perform some action or operation in response to sensor data collected by the robot at the designated location.

In some embodiments, as noted above, the robot may be configured for inspection purposes only. In some such embodiments, the robot may be configured to obtain information related to a potential issue and develop a report or other database associated with a specific task and then provide such information to the controller, building monitoring system, or other system or output such information on a display of the robot for the purpose of interacting with a human counterpart. In some embodiments, after the robot performs an inspection, a request for a human mechanic can be made to have an appropriate maintenance action performed. In some embodiments, after the robot performs an inspection, the robot may be configured (e.g., programmed) to perform an action to address the issue. Such actions can include, for example and without limitation, performing an adjustment of a component or element of the elevator system, perform a cleaning action, remove debris, adjust the position of a part that may be out of alignment, or the like.

Advantageously, embodiments of the present disclosure provide for integrated building systems that incorporate a robot. By leveraging robots in a building, routine or triggered checks on certain elevator equipment as performed by the robot(s) can help resolve potential issues quickly by providing an additional, early validation of a potential issue. This additional validation may eliminate the need for a maintenance visit from human maintenance personnel. Further, early detection of issues related to elevator systems may be achieved through an automated process using such robots. For example, scheduled maintenance inspections may be performed using the robots described herein. The schedule could be daily, weekly, or at some other predetermined interval. Such a scheduled inspection performed by a robot ensures consistency between inspections and consistent data collection and monitoring. The scheduled inspections may be performed during non-business hours, thus providing additional advantages.

Additionally, in accordance with some embodiments, the robots may be integrated into and/or in communication with an elevator system to enable calling and control of elevator cars and/or other parts of the elevator system. Such communication may be directly communicated from the robot to an elevator controller or may be through other communication channels, such as through a controller, building maintenance system, IoT system, or the like.

The terminology used herein is for the purpose of describing particular embodiments only and is not intended to be limiting of the present disclosure. The terms "about" and "substantially" are intended to include the degree of error associated with measurement of the particular quantity and/or manufacturing tolerances based upon the equipment available at the time of filing the application. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

Those of skill in the art will appreciate that various example embodiments are shown and described herein, each having certain features in the particular embodiments, but the present disclosure is not thus limited. Rather, the present disclosure can be modified to incorporate any number of variations, alterations, substitutions, combinations, sub-combinations, or equivalent arrangements not heretofore described, but which are commensurate with the scope of the present disclosure. Additionally, while various embodiments of the present disclosure have been described, it is to be understood that aspects of the present disclosure may include only some of the described embodiments. Accordingly, the present disclosure is not to be seen as limited by the foregoing description, but is only limited by the scope of the appended claims.

What is claimed is:

1. A building system comprising:
a controller configured to receive requests associated with an elevator system of a building;
a database containing one or more verification procedures associated with the elevator system, wherein the controller is operable to initiate one or more of the verification procedures; and
a robot configured in communication with the controller and configured to receive instructions from the controller, wherein the instructions include a portion of at least one verification procedure, wherein the robot is configured to perform one or more tasks based on the at least one verification procedure, the robot comprising at least one sensor configured to collect sensor data;
wherein at least one of the controller and the robot are configured to perform an operation in response to sensor data collected by the robot, wherein the operation is a determination if the elevator system operation is nominal or if further action is required, and
wherein the robot is configured to assist a human person in performing a maintenance operation on the elevator system by at least one of performing a maintenance operation on the elevator system outside of an elevator car or interfacing directly with an elevator car of the elevator system.

2. The building system of claim 1, wherein the robot comprises a sensor assembly having one or more sensors selected from optical sensors, infrared sensors, ultraviolet light sensors, chemical sensors, biological sensors, accelerometers, acoustic and/or vibration sensors, temperature sensor, air quality sensors, air pressure sensors, air flow speed sensors, motor current/feedback sensors, ultrasonic sensors, radar sensors, magnetic sensors, electromagnetic sensors.

3. The building system of claim 1, wherein the robot is configured to call an elevator car in response to receiving the portion of the at least one verification procedure.

4. The building system of claim 1, wherein the controller is part of an IoT system of the building.

5. The building system of claim 1, wherein the controller is located at a location remote from the building.

6. The building system of claim 1, wherein at least one of the robot and the controller are configured to perform a control event comprising the one or more tasks to obtain sensor-detected event information.

7. The building system of claim 6, wherein at least one of the robot and the controller are configured to perform a correlation between expected result information of the control event and the sensor-detected event information collected by the robot.

8. The building system of claim 1, wherein the controller is configured to send dispatch instructions to the robot and the robot is configured to travel to a location based on the dispatch instructions.

9. The building system of claim 1, wherein the robot is configured to place hall or car calls via an elevator dispatch API.

10. A method of performing a building maintenance operation comprising:
receiving a request for service associated with an elevator system of a building at a controller;
dispatching a robot to a location associated with the request for service;
obtaining sensor data with the robot at the location and associated with the request for service;
processing the sensor data to determine if an issue with the elevator system is present related to the request for service;
performing a maintenance task in response to the determination of an issue with the elevator system;
wherein the robot is configured to assist a human person in performing the maintenance task on the elevator system by at least one of performing a maintenance operation on the elevator system outside of an elevator car or interfacing directly with an elevator car of the elevator system.

11. The method of claim 10, wherein the maintenance task comprises generating a report regarding the issue with the elevator system.

12. The method of claim 10, wherein the maintenance task comprises:
performing a maintenance operation on the elevator system using the robot.

13. The method of claim 10, further comprising:
performing continuous monitoring of the elevator system with the robot.

14. The method of claim 13, wherein the robot is configured to call and use an elevator car of the elevator system during the continuous monitoring of the elevator system.

15. The method of claim 10, wherein the sensor data is associated with a leveling operation of an elevator car at a landing of the elevator system.

16. The method of claim 10, wherein the sensor data is obtained by the robot from the elevator system, wherein the sensor data is obtained by sensors of the elevator system.

17. The method of claim 10, wherein the controller is one of part of an IoT system of the building or in communication with the IoT system of the building.

18. The method of claim 10, further comprising performing an inspection operation with the robot to obtain the sensor data.

19. The method of claim 10, wherein the processing of the sensor data is performed on the robot.

* * * * *